United States Patent [19]

Ganshorn et al.

[11] Patent Number: 4,728,076
[45] Date of Patent: Mar. 1, 1988

[54] PRESSURE DISCHARGE APPARATUS

[76] Inventors: Goerge H. Ganshorn, 345 N. Fine; Richard D. Bower, 5089 E. Hammond, both of Fresno, Calif. 93727

[21] Appl. No.: 912,807
[22] Filed: Sep. 29, 1986
[51] Int. Cl.⁴ ............................................. F16L 37/28
[52] U.S. Cl. .................................. 251/149.6; 285/39
[58] Field of Search .......................... 251/149.6, 149; 137/614.04; 285/39

[56] References Cited

U.S. PATENT DOCUMENTS

| | | | |
|---|---|---|---|
| 1,632,149 | 6/1927 | Sanford | 251/149.6 |
| 1,740,015 | 12/1929 | Hooper et al. | 251/149.6 |
| 2,825,583 | 3/1958 | Lomb | 251/149.6 |
| 3,101,812 | 8/1963 | Mercer, Sr. | 285/39 |
| 4,105,046 | 8/1978 | Sturgis | 251/149.6 |
| 4,108,474 | 8/1978 | Sigrist | 285/39 |
| 4,159,102 | 6/1979 | Fallon et al. | 251/149.6 |

*Primary Examiner*—A. Michael Chambers
*Attorney, Agent, or Firm*—Worrel & Worrel

[57] ABSTRACT

A pressure discharge apparatus for releasing residual pressure from a hydraulic line or the like. The apparatus includes a grasping assembly adapted slidably to mount and urge a fluid pressure connector between a ready position and a pressure release position; and a fluid receiving conduit borne by the grasping assembly for releasably sealable pressure discharge engagement with the fluid pressure connector in the pressure release position.

9 Claims, 5 Drawing Figures

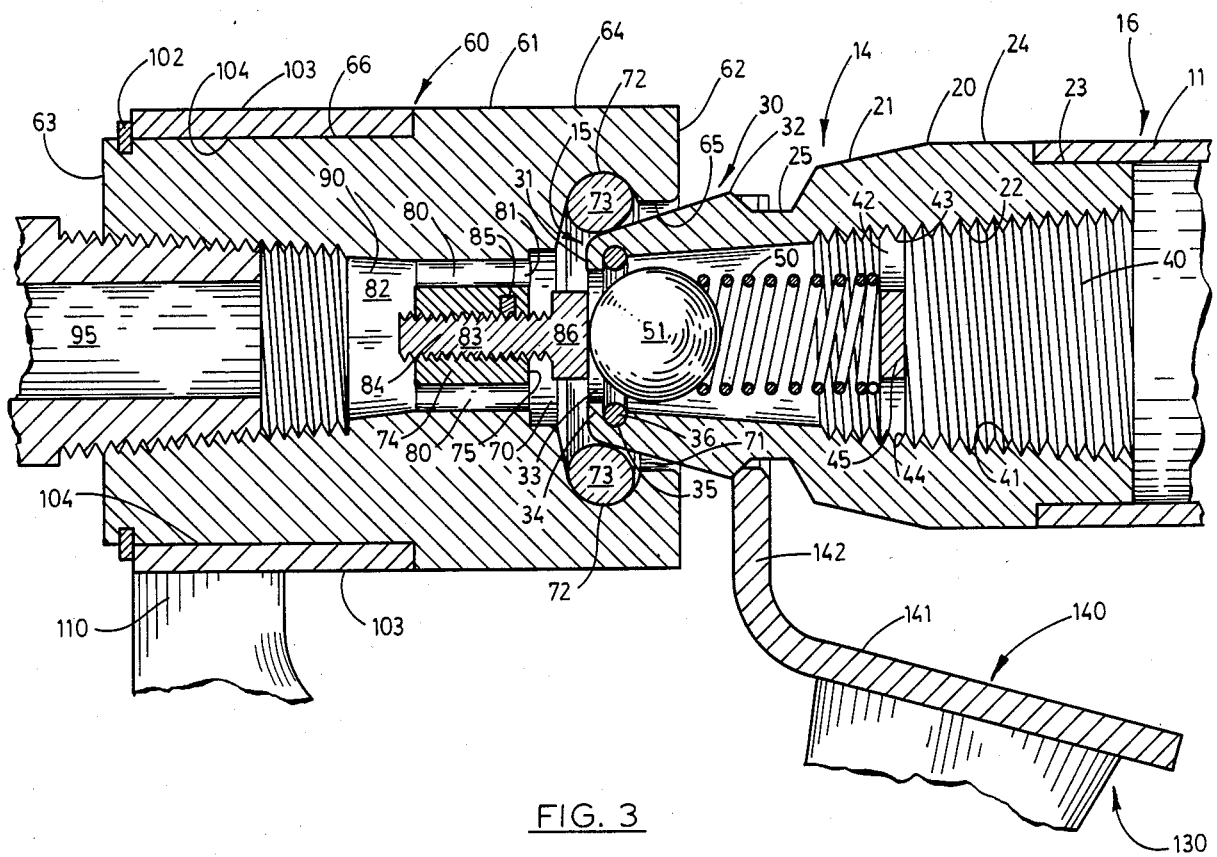
FIG. 3
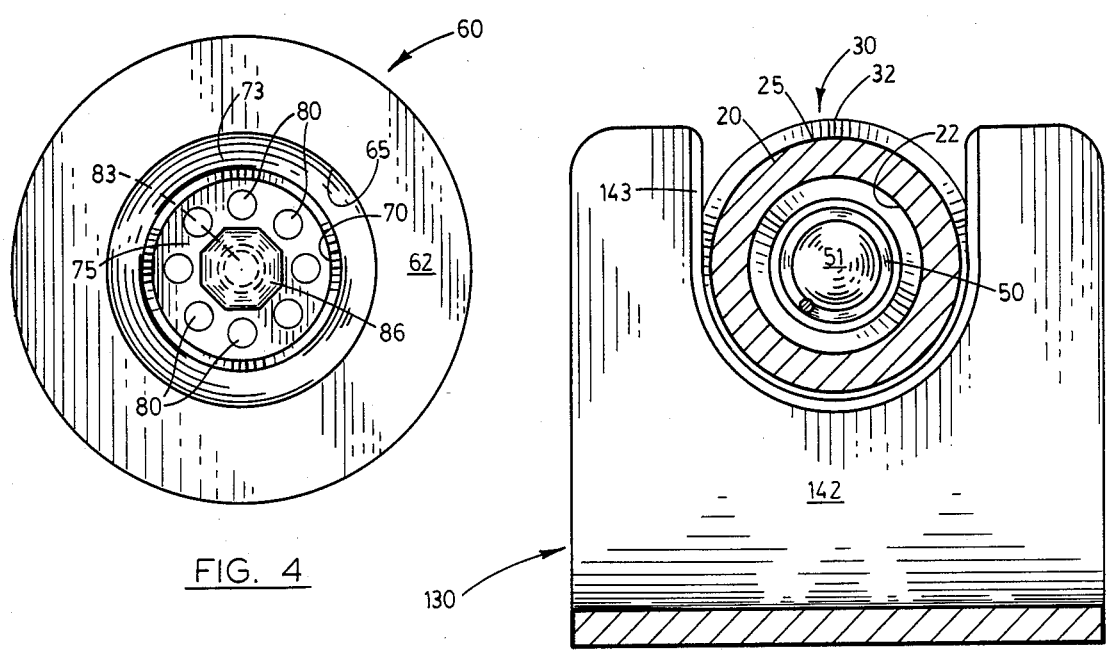
FIG. 4
FIG. 5

PRESSURE DISCHARGE APPARATUS

BACKGROUND OF THE INVENTION

1. Field of the Invention

The present invention relates to a pressure discharge apparatus having particular utility in relieving residual hydraulic pressure from detached hydraulic lines and the like, and more particularly to such an apparatus which is unusually well suited to permit the collection of hydraulic oil from a hydraulic line after the pressure is released for the purpose of recycling.

2. Description of the Prior Art

The beneficial effects of employing hydraulic power in combination with overland vehicles has been known for some time. Common hydraulic applications in the mechanical and chemical engineering fields include the flow of gases, oils, or other liquids; lubrication; and fluid machinery, such as pumps, turbines, propellers, fans, and fluid powered transmission and control devices including servomechanisms. It is well understood that it is occasionally necessary for an apparatus which is receiving hydraulic power to be detached or otherwise disconnected from the source of hydraulic power for maintenance, or assorted other reasons. Under these circumstances, the apparatus receiving hydraulic power usually has hydraulic lines which are provided with male connectors which releasably mate with an appropriate connector seat, thus permitting the hydraulic lines to be easily detached.

Typically, when hydraulic lines are detached, residuary hydraulic pressure remains in the uncontrolled side of the hydraulic line; this uncontrolled side is typically that side of the hydraulic line which bears the male connector. In such a state, many individuals find it difficult, if not impossible, operatively to interconnect the male connector into fluid flow communication with the connector seat unless steps are taken first to release the residuary pressure from the hydraulic line. Of course, once the pressure is released, the male connector is easily seated.

The most prevalent practice used in addressing this problem of relieving residuary hydraulic pressure has been simply to exert force, by whatever means, to the male connector that is affixed to the end of the hydraulic line, for the purpose of releasing a given volume of hydraulic oil. This release of hydraulic oil, and the associated pressure, thereafter permits the male connector to be easily joined in fluid flow communication to the connector seat.

It should be understood that when force is exerted on the male connector for the purpose of releasing hydraulic oil and the pressure associated therewith; the hydraulic oil usually spews out suddenly and uncontrollably in the general vicinity of the male connector as the pressure dissipates. As should be apparent from the foregoing description, the prevalent practice, besides being a generally undesirable task, is also quite inefficient and uneconomical, in view of the fact that significant amounts of somewhat expensive hydraulic oil is lost each and every time the hydraulic lines need to be reconnected. Still further, this practice also tends to cause damage to the male connectors and the associated hydraulic lines thus causing their premature replacement on occasion.

Therefore, it has long been known that it would be desirable to have an apparatus for releasing pressure from a fluid pressure connector which can be conveniently used and operated, and which has the capability of collecting the hydraulic oil released for subsequent use or recycling. Similarly, it has also been known that it would be desirable to have an apparatus which is particularly well suited for compact and convenient storage in an overland vehicle, and which permits an operator conveniently to release pressure from hydraulic lines and male connectors so as to minimize damage thereto.

SUMMARY OF THE INVENTION

Therefore, it is an object of the present invention to provide an improved pressure discharge apparatus.

Another object is to provide such a pressure discharge apparatus which conveniently operates in both an operational and stored configuration to perform its respective functions.

Another object is to provide such a pressure discharge apparatus which can be rapidly assembled and dependably operated to release hydraulic oil, and to permit the collection thereof, while simultaneously possessing the capability of being easily disassembled and transported in a compact stored configuration.

Another object is to provide such a pressure discharge apparatus which operates dependably to release hydraulic pressure from assorted fluid pressure connectors of variable dimensions.

Another object is to provide such a pressure discharge apparatus which is characterized by simplicity of construction; substantially care free maintenance; and which can be sold at a relatively inexpensive price.

Further objects and advantages are to provide improved elements and arrangements thereof in an improved pressure discharge apparatus for the purposes described which is dependable, economical, durable and fully effective in accomplishing its intended purposes.

These and other objects and advantages are achieved in an improved pressure discharge apparatus for use with a fluid pressure connector wherein a fluid receiving conduit is slidably received and fixed in an operational attitude on a grasping assembly which has a capture unit; and the grasping assembly urges the fluid pressure connector in an arcuate path of travel substantially aligned with the fluid receiving conduit and into releasably sealable mating engagement therewith to permit the release of hydraulic oil and pressure from the fluid pressure connector and an associated hydraulic line.

BRIEF DESCRIPTION OF THE DRAWINGS

FIG. 3 is a somewhat enlarged, fragmentary, vertical section taken on line 3—3 of FIG. 2.

FIG. 4 is a fragmentary, vertical section taken on line 4—4 of FIG. 1.

FIG. 5 is a fragmentary, vertical section taken on line 5—5 of FIG. 2.

DESCRIPTION OF THE PREFERRED EMBODIMENT

Figure 1:
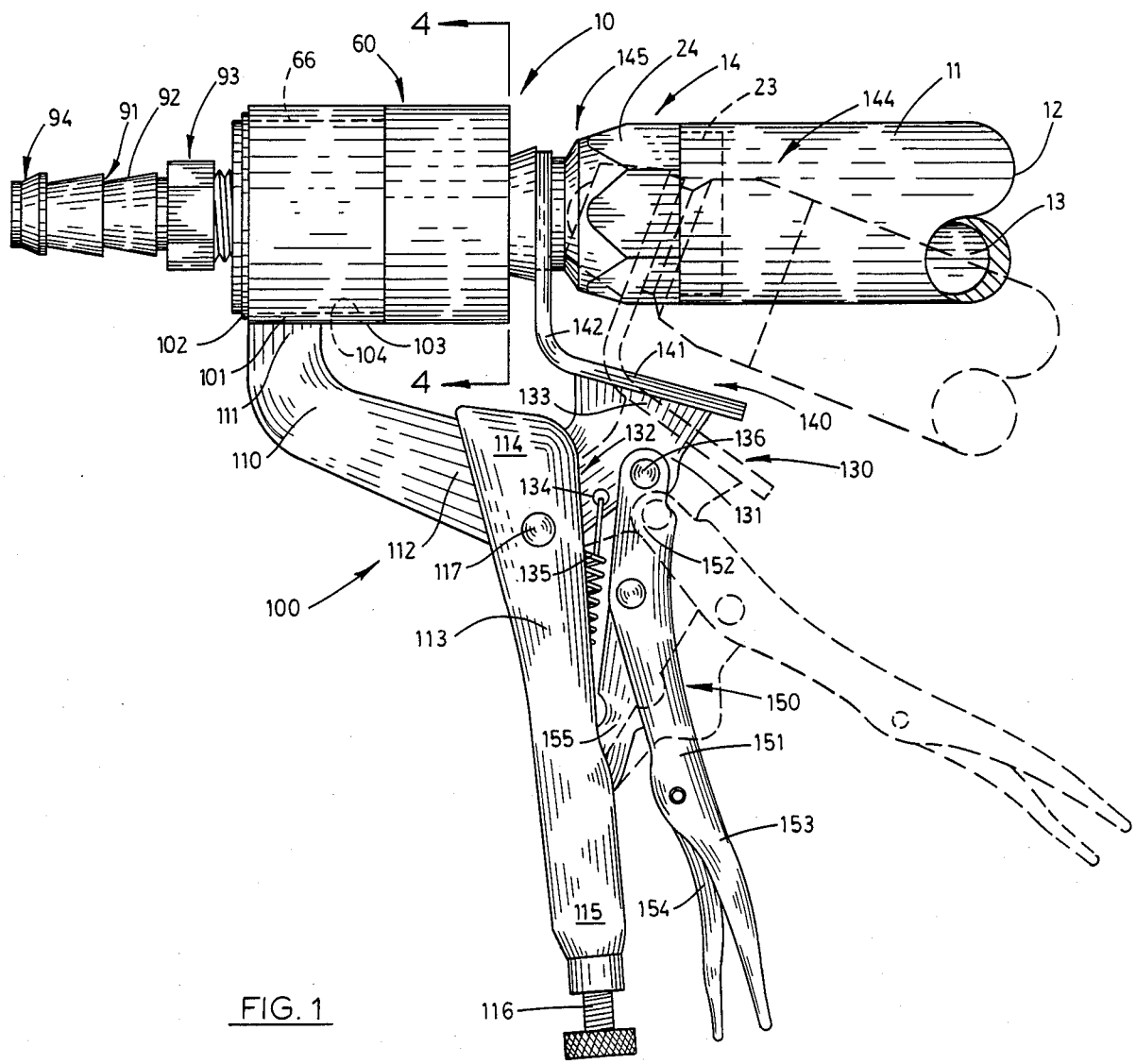
FIG. 1 is a side elevational view of a pressure discharge apparatus of the present invention shown in a typically operative configuration deploying a fluid pressure connector in an operational attitude.

Referring more particularly to the drawings, the pressure discharge apparatus embodying the principles of the present invention is generally indicated by the numeral 10 in FIG. 1.

Figure 2:
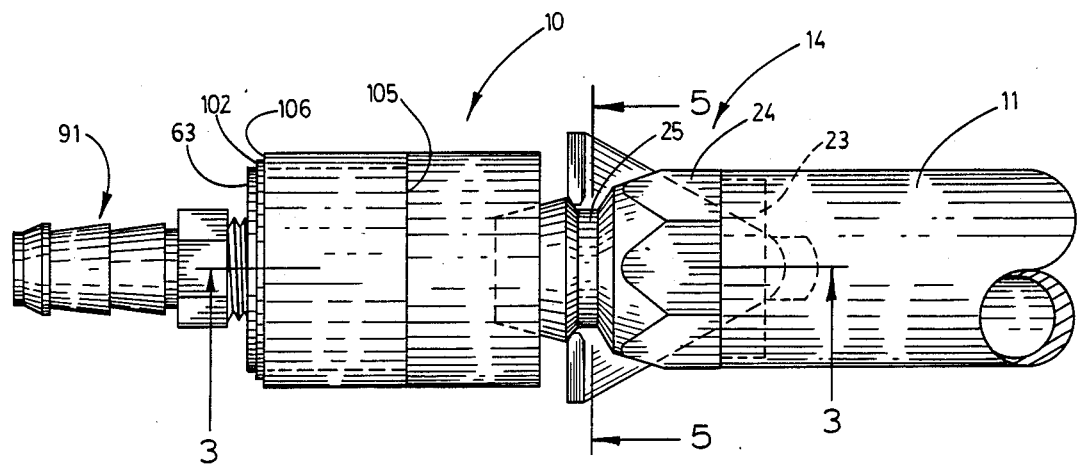
FIG. 2 is a top plan view of the apparatus of FIG. 1.

As best understood by a close study of FIGS. 1 and 2, the apparatus 10, which is shown in a compact, hand operable configuration, is adapted to release hydraulic oil and the accompanying residual hydraulic pressure that remains in a conventional hydraulic line 11; the structure of which is shown in FIG. 1. As illustrated, the line 11 has a unitary, substantially circular wall 12 which is manufactured of strong yet somewhat flexible material. The wall 12 defines a lumen 13 which confines hydraulic oil (not shown) which is pumped under pressure. Appropriately affixed, and in fluid-flow communication with the lumen is a fluid pressure connector; or what is commonly termed a male end 14. The fluid pressure connector has a first end 15 and an opposed second end 16.

As best understood by a study of FIG. 3, the male end 14 has a continuous wall 20 of substantially annular configuration. The wall 20 has an outside surface 21 and an opposed inside surface 22. As best understood by a study of FIG. 1, the male end has a hydraulic line seat 23 which is positioned adjacent to the second end 16 and which is adapted to mate in sealably secure relationship with the line 11. The male end also has a thickened mid-portion 24 which is formed in an octagonal configuration; this is best seen by reference to FIG. 2. It should be understood that this thickened mid-portion is dimensioned to receive a suitably dimensioned wrench (not shown). As best illustrated by reference to FIG. 3, the outside surface 21 has formed therein a reduced diameter neck portion indicated by the numeral 25.

The fluid pressure connector or male end 14 has a nipple portion 30 which is formed in a substantially frusto-conical configuration, illustrated by reference to FIG. 3. The nipple portion has a proximal end 31; and a distal end 32, which is adjacent to the reduced diameter neck portion 25. In close proximity to the proximal end, and formed therein the nipple portion, is an orifice 33. The orifice is defined by a lip 34. Closely adjacent to the lip, is a sealing ring seat 35 which is formed into the inside surface 22. The sealing ring seat is adapted to receive and operatively deploy an appropriately dimensioned O-ring or rubber seal 36.

As most clearly illustrated by reference to FIG. 3, the inside surface 22, of the wall 20, defines a channel or lumen 40. Formed into the inside surface, and in close proximity to the second end 16, is a threaded portion 41, which is adapted to receive a spring retainer plate 42. As illustrated, the spring retainer plate has a first end 43, and a second end 44, which are suitably dimensioned to screw-threadably mate in receiving relationship with the threaded portion. The spring retainer plate is thereafter deployed in a predetermined attitude internally of the lumen. The spring retainer plate has a central orifice 45 which is best illustrated by reference to FIG. 3.

The spring retainer plate 42 operatively positions a helical biasing spring 50. As best imagined by a study of FIGS. 3 and 5, the spring 50 suitably positions a ball bearing 51 in sealable secure mating relationship thereagainst the O-ring or rubber seal 36 which is deployed in the sealing ring seat 35. As should be understood, the ball bearing, when positioned thereagainst the O-ring, is effective to prevent any hydraulic oil from entering or escaping into the lumen 40. Similarly, it should be appreciated that when the ball bearing is urged away from its seated position in sealably secure mating relationship with the O-ring, hydraulic oil can enter or escape from the lumen through the orifice 33; this is best illustrated by reference to FIG. 3 wherein the ball bearing is ajar from the seated position thus allowing hydraulic oil and its associated pressure to move through the orifice 33.

The apparatus 10 of the subject invention has a fluid receiving conduit generally indicated by the numeral 60 in FIG. 1. The conduit 60 has a main body 61 which has a proximal or receiving end 62; a distal or discharge end 63; an outside surface 64; and a correspondingly opposed inside surface 65. The main body also has a reduced diameter portion 66 which is illustrated most clearly by reference to FIG. 1. As best illustrated by reference to FIG. 3, an annular connector seat 70 is formed in the receiving end of the conduit. The annular connector seat has an orifice 71 which operatively receives the nipple portion 30 of the male end 14. Formed into the inside surface 65 is a suitably dimensioned O-ring seat 72 which is adapted operatively to receive and deploy an annular sealing ring 73 of predetermined dimensions. The annular sealing ring, which is manufactured of rubber or the like, is adapted to sealably mate with the proximal end 31 of the nipple portion. This relationship is illustrated most clearly in FIG. 3. As should be appreciated, the annular sealing ring is mounted for removably fitted receipt internally of the main body for easy repair or replacement.

The main body 61 has a central portion 74 which forms a substantially planar bottom surface 75 for the annular connector seat 70. As best illustrated by reference to FIG. 4, the main body has formed therein a multiplicity of fluid receiving channels of predetermined dimensions 80. The fluid receiving channels have a first end 81, which communicates in fluid-flow relation with the annular connector seat; and an opposed second end 82 which communicates in fluid-flow relation with the discharge end 63. As illustrated most clearly with respect to FIGS. 3 and 4; the central portion 74 is screw-threadably adapted to receive and mount substantially centrally and internally of the annular connector seat an actuating member or bolt 83. The bolt has a threaded, central shaft 84 which is screw-threadably received internally of the central portion and is secured in adjustable mating relationship, by a nylon or plastic lock member 85. It should be understood that the nylon or plastic lock member is operable to compress the central shaft in a secured fixed attitude internally of the central portion. The bolt has a head 86 which is deployed in an appropriate attitude to operatively engage the ball bearing 51 to cause it to be moved to a fluid release position, shown most clearly in FIG. 3, when the fluid pressure connector 14 is received internally of the fluid receiving conduit 60, and in sealable mating engagement with the annular connector seat. Of course, it should be understood that the head is adapted to receive a suitably dimensioned wrench. This permits the adjustment of the bolt to allow it to engage variously dimensioned male ends 14.

The main body 61 has formed therein a channel 90, of predetermined dimensions, which is screw-threadably adapted to receive a threaded hose fitting 91. The hose fitting 91, which is best illustrated by reference to FIGS. 1 and 2, has an outside surface 92; a proximal end 93; and a distal end 94. As should be appreciated the outside surface and the distal end are suitably dimensioned to be received internally of a flexible hose, not shown. The proximal end of the hose fitting is of octagonal configuration which permits the receipt of an appropriately dimensioned wrench. The hose fitting has a lumen 95 which is positioned in fluid-flow communication with the multiplicity of fluid receiving channels 80. This relationship is most clearly illustrated by reference to FIG. 3.

The apparatus 10 of the subject invention has a hand operated grasping assembly generally indicated by the numeral 100, which is adapted slidably to receive and affix the fluid receiving conduit 60 in an operational attitude. The grasping assembly, which captures the fluid receiving conduit, has a substantially annular support frame 101 which receives the reduced diameter portion 66 of the main body 61. As best understood by a study of FIG. 3, a suitably dimensioned snap ring 102 is received about the distal end 63; the snap ring capturing the main body in secure mating relationship with the support frame. The support frame has an outside surface 103; an inside surface 104; a first end 105; and an opposed second end 106. Suitably affixed by welding, or the like, to the outside surface 103, is an arm member 110 of angulated configuration. The arm 110 has a first end 111, which is attached to the outside surface of the support frame; and a second end 112 which is suitably welded or affixed to a handle 113, which is formed in a generally U-shaped cross-sectional configuration. This is best imagined by a study of FIG. 1. The handle has a proximal end 114 and a distal end 115. Deployed at the distal end in a screw-threadably secure mating relationship therewith, is an adjustment member 116. A suitably dimensioned pivot pin 117 is received through the handle and secured thereto, by welding or the like.

As best understood by a study of FIG. 1, the grasping assembly 100 pivotally receives, and mounts in an operative attitude, a capture unit or assembly generally indicated by the numeral 130. The capture unit has a base portion 131 which has a first end 132, which is operatively engaged by the pivot pin 117. The base portion also has a second end 133. Formed into the base portion is a suitably dimensioned spring seat 134 which receives a helical biasing spring 135. As should be understood, the spring is appropriately attached to a predetermined location internally of the handle 113. The base portion also receives and positions in a suitable predetermined attitude an appropriately dimensioned pivot pin 136.

Welded to the second end 133, of the base portion 131, is an angulated mounting plate 140, which is deployed for individual receiving engagement with the male end 14. The plate 140 has a substantially horizontal surface 141, and a substantially vertical surface 142; which is illustrated most clearly by a study of FIG. 1. Formed into the vertical surface 142 is a vertically disposed channel 143, which is adapted to receive, and restrain against movement, the male end 14. As illustrated most clearly by a study of FIGS. 3 and 5, the plate is appropriately dimensioned to secure and capture the male end about the neck portion 25. When appropriately employed, the capture unit 130 is adapted to urge the fluid pressure connector or male end in an arcuate path of travel that is substantially aligned with the main body 61 and into releasable sealable mating engagement with the annular connector seat 70. It should be understood, therefore, that the capture unit moves the fluid pressure connector from a ready position, indicated generally by the numeral 144, wherein the fluid pressure connector is substantially aligned and in fixed spaced relationship with the main body; to the pressure release position 145. In the pressure release position, as indicated most clearly by reference to FIG. 3, the actuating member 83 causes the ball bearing 51 to be displaced from a seated position, thus permitting hydraulic oil contained within the line 11 to escape into the fluid receiving conduit 60.

Pivotally mounted in an operational attitude on and about the pivot pin 136, is a depressible lever member generally indicated by the numeral 150. The lever member 150 which is adapted to impart movement to the capture unit 130 to urge it from the ready position 144 to the pressure release position 145, has a main body 151; a proximal end 152, which is operatively received about the pivot pin 136; and a distal end 153 which deploys a pivotally mounted release member 154. An adjustment bar 155 is pivotally mounted in a deployed attitude on the lever member for operative engagement with the screw-threadable adjustment member 116 internally of the handle 113. As should be understood, the capture unit 130 is moved in an arcuate path of travel when force is exerted on the lever member 150. The screw-threadable adjustment member 116 is individually adjustable to cause the capture assembly to urge the fluid pressure connector into a sealable secure pressure discharging engagement internally of the fluid receiving conduit 60 in the fluid release position 145 to permit the release of hydraulic oil and the associated pressure which resides internally of the line 11. The hydraulic oil so released departs from the hose fitting 91 and is collected in an appropriate container (not shown) for recycling or the like.

OPERATION

The operation of the described embodiment of the present invention is believed readily apparent and is briefly summarized at this point.

The pressure discharge apparatus 10 adapted to release hydraulic oil and the associated pressure from a fluid pressure connector, or male end 14 having a fluid release position 145 or the like is best understood by a study of FIGS. 1 and 3. As shown therein, a grasping assembly 100 is adapted slidably to mount and support for movement, the fluid pressure connector between a ready position 144 and a fluid release position. A fluid receiving conduit 60 is borne by the grasping assembly and is adapted for releasably sealable, pressure discharging engagement with a fluid pressure connector in the fluid release position. As best understood by a study of FIGS. 3 and 5, a capture unit 130, which is integral with, and pivotally mounted to the grasping assembly, urges the fluid pressure connector in an arcuate path of travel from the ready position to the fluid release position. As illustrated most clearly by reference to FIG. 5, a vertically disposed channel 143, which is formed in the capture assembly, is adapted to operatively deploy the fluid pressure connector in an operational attitude and thereafter move it in a substantially aligned path of travel into releasable sealable mating engagement with the annular connector seat 70.

As best understood by reference to FIG. 1, a depressible lever member 150 imparts movement to the capture unit 130 to cause it to move the fluid pressure connector 14 to the fluid release position 145. When the capture unit positions the fluid pressure connector in the fluid release position, the actuating member 83 which is screw-threadably mounted substantially centrally and internally of the annular connector seat 70, causes the ball bearing 51 to be moved from its seated position thereagainst the rubber seal 36, to a position whereby hydraulic oil is able to escape past the ball bearing and into the annular connector seat. Hydraulic oil so escaping enters into the fluid receiving channels 80, and thereafter travels into the lumen 95 and out the distal end 94 of the hose fitting 91. The hydraulic oil is thereafter collected for recycling and the like.

Therefore, the apparatus 10 which is adapted to release pressure from a fluid pressure connector 14 having a fluid release position 145 and the like is capable of utilization to a wide variety of environments and can easily be assembled and disassembled for convenient usage and storage.

Although the invention has been herein shown and described in what is conceived to be the most practical and preferred embodiment, it is recognized that departures may be made therefrom within the scope of the invention which is not to be limited to the illustrative details disclosed.

Having described our invention, what we claim as new and desire to secure by Letters Patent:

1. A hand held pressure discharge apparatus adapted to release pressure from a fluid pressure connector having a substantially frusto-conically shaped nipple portion and a reduced diameter neck portion, the fluid pressure connector having a fluid release position comprising:
   a fluid receiving conduit having a main body which has a reduced diameter portion, and an annular connector seat, said connector seat dimensioned to receive the nipple portion of the fluid pressure connector;
   a hand held grasping assembly for supporting the fluid receiving conduit in an operational attitude, the grasping assembly having a handle; and
   a mount borne by the handle for slidably engaging and urging the fluid pressure connector in a substantially arcuate path of travel into the pressure release position internally of the annular connector seat.

2. The apparatus of claim 1 wherein the grasping assembly for supporting the fluid receiving conduit mounts a support frame adapted to receive and closely hold the reduced diameter portion of the fluid receiving conduit.

3. The apparatus of claim 2 wherein the mount borne by the handle has a capture unit; the capture unit having a base portion pivotally mounted on the handle, said base portion further mounting an angulated mounting plate and a pivotally movable lever member operable to engage the handle, said angulated mounting plate slidably receiving and supporting the fluid pressure connector in the substantially arcuate path of travel for movement into releasably sealable mating engagement internally of the fluid receiving conduit.

4. The apparatus of claim 3 wherein the fluid receiving conduit mounts an annular sealing ring dimensioned sealably to engage the nipple portion of the fluid pressure connector when it is disposed in the pressure release position, and a screw-threadably adjustable actuating member is mounted substantially centrally and internally of the annular connector seat.

5. A hand held pressure discharge apparatus for releasing pressure from a fluid pressure connector, the pressure discharge apparatus comprising:
   a hand held grasping assembly having a handle mounting an arm member of angulated configuration, said arm member further mounting a support frame;
   a capture unit pivotally mounted on the handle is adapted slidably to mount and support the fluid pressure connector for movement between a ready position and a pressure release position;
   a fluid receiving conduit having a reduced diameter portion dimensioned to be matingly received in a fixed operational attitude by the support frame, the fluid receiving conduit borne by the grasping assembly for releasable pressure discharging engagement with the fluid pressure connector in the pressure release position; and
   a lever member pivotally borne by the capture unit and operable to engage the grasping assembly adapted to urge the fluid pressure connector from the ready position to the pressure release position, said lever member urging the fluid pressure connector along an arcuate path of travel and positioning the fluid pressure connector in mating engagement with the fluid receiving conduit in the pressure release position.

6. The apparatus of claim 5 wherein the fluid receiving conduit has a main body that has formed therein an annular connector seat, a multiplicity of fluid receiving channels and a discharge end, said main body mounting in outwardly facing relation internally of the annular connector seat a screw-threadably adjustable actuating member.

7. The apparatus of claim 6 wherein the capture assembly has a base portion which is pivotally mounted on the handle, the base portion further mounting an angulated mounting plate having a channel formed therein that receives and restrains against movement the fluid pressure connector.

8. The apparatus of claim 7 wherein the lever member for urging the fluid pressure connector from the ready position to the pressure release position pivotally mounts an adjustment bar which is operable to engage the handle.

9. A hand held pressure discharge apparatus adapted to release pressure from a fluid pressure connector having a nipple portion and a reduced diameter neck portion, the apparatus comprising
   a fluid receiving conduit having a main body that has formed therein an annular connector seat, a multiplicity of fluid receiving channels, a fluid discharge end, and a reduced diameter portion, the annular connector seat dimensioned to receive the nipple portion of the fluid pressure connector;
   a screw-threadably adjustable actuating member mounted substantially centrally and internally of the annular connector seat;
   an annular seal mounted for removably fitted receipt internally of the annular connector seat, the annular seal adapted sealably to mate with the nipple portion when the fluid pressure connector is received in the annular connector seat;
   a screw-threadable hose fitting mounted on and about the discharge end of the main body, the hose fitting disposed in fluid communication with the annular connector seat; and
   a hand held grasping assembly having a handle and an arm member of angulated configuration, the arm member mounting a frame conformably dimensioned slidably to receive the reduced diameter portion, and thereby affix the fluid receiving conduit in an operational attitude, and a capture unit pivotally mounted on the handle for receiving the reduced diameter neck portion of the fluid pressure connector, said capture unit having formed therein a vertically disposed channel which is conformably dimensioned slidably to receive the reduced diameter neck portion, the capture unit further pivotally mounting a lever member which is operable when depressed to urge the fluid pressure connector in an arcuate path of travel defined between a ready position, wherein the fluid pressure connector is disposed in fixed spaced relation to the annular connector seat, and a pressure release position, wherein the fluid pressure connector is substantially aligned with the main body and disposed in releasably sealable mating engagement with the annular connector seat.

* * * * *

UNITED STATES PATENT AND TRADEMARK OFFICE
CERTIFICATE OF CORRECTION

PATENT NO. : 4,728,076

DATED : March 1, 1988

INVENTOR(S) : George H. Ganshorn and Richard D. Bower

It is certified that error appears in the above—identified patent and that said Letters Patent are hereby corrected as shown below:

Title Page, Item [76] Inventor:

delete "Goerge" and substitute ---George---.

Column 7, line 44, delete the semicolon after "unit" and substitute ---,---.

Signed and Sealed this

Twenty-sixth Day of July, 1988

Attest:

DONALD J. QUIGG

*Attesting Officer*      *Commissioner of Patents and Trademarks*